United States Patent [19]
Hannoosh

[11] Patent Number: 6,050,234
[45] Date of Patent: Apr. 18, 2000

[54] TWO-CYCLE CERAMIC/METALLIC INTERNAL COMBUSTION ENGINE

[75] Inventor: James G. Hannoosh, 76 Beverly Dr., Avon, Conn. 06001

[73] Assignee: James G. Hannoosh, Avon, Conn.

[21] Appl. No.: 09/146,097

[22] Filed: Sep. 3, 1998

[51] Int. Cl.⁷ .................................................. F01B 31/00
[52] U.S. Cl. .................................... 123/193.1; 123/193.4; 123/193.6; 123/193.2
[58] Field of Search .............................. 123/193.6, 193.2, 123/193.4, 65 VC; 92/222, 187

[56] References Cited

U.S. PATENT DOCUMENTS

| | | | |
|---|---|---|---|
| Re. 34,143 | 12/1992 | Rao et al. | 123/193.4 |
| Re. 34,336 | 8/1993 | Wade et al. | 123/193.2 |
| 4,466,399 | 8/1984 | Hinz et al. | 123/193.6 |
| 4,696,224 | 9/1987 | Mishima | 92/222 |
| 5,063,881 | 11/1991 | Kawamura | 123/65 VC |
| 5,113,262 | 5/1992 | Kojima | 92/187 |
| 5,327,813 | 7/1994 | Debell et al. | 92/187 |

*Primary Examiner*—Marguerite McMahon
*Attorney, Agent, or Firm*—Michael D. Rechtin; Foley & Lardner

[57] ABSTRACT

A ceramic/metallic, low polluting, long life, high performance, two-cycle gasoline engine that requires no oil lubrication. This engine eliminates the need for oil lubrication by: a) incorporating advanced ceramic materials, such as silicon nitride for critical engine components, b) employing the use of gasoline as well as the products of combustion of gasoline as lubricants for some critical surfaces, and c) engineering design approaches for critical engine components and assemblies. The elimination of the need for oil lubrication allows the engine to produce far less pollutants than conventional two-cycle engines.

9 Claims, 5 Drawing Sheets

TWO-CYCLE CERAMIC/METALLIC INTERNAL COMBUSTION ENGINE

The present invention is concerned generally with a two-cycle engine constructed of ceramic and metallic parts. More particularly, the invention is concerned with a hybrid two-cycle engine having an engine cylinder, piston and piston pin constructed of ceramic material and a connecting rod having a metallic portion positioned within the ceramic piston.

Conventional two-cycle reciprocating gasoline engines are used to power a variety of machines such as outboard motors and chain saws and are also under development for automotive applications. These engines were developed long ago and are known for their high power-to-weight performance since they provide power on every piston stroke as opposed to four cycle engines that provide power on every other stroke (the Otto cycle). Two-cycle engines also have the advantage that they are mechanically simple and thus inexpensive to build and repair when compared to four cycle engines. They also do not require a wet "sump" of oil as do four cycle engines, thus allowing them to be run in any position without fear of oil starvation. Oil lubrication is provided by mixing oil with the fuel, usually gasoline, either indirectly by intimate mixing in a remote container, or directly, under a process known as "direct injection."

The present invention is directed to a two-cycle gasoline powered engine which does not require oil lubrication, thus eliminating a major source of air pollution. Conventional two-cycle engines are substantial sources of air pollution because they burn their lubricating oil as part of the combustion process. This air pollution, often seen as blue colored smoke emanating from chain saws, grass trimmers, lawn mowers, outboard motors, hedge trimmers, etc., is currently deemed unacceptable by the California Air Resources Board (CARB) and EPA standards. The major pollutants emanating from a two-cycle engine are caused by the burning of the oil in the fuel. The present invention allows engine emissions to be essentially the same as, or lower than, current four cycle engines; but the engine has approximately half the weight of a four cycle engine.

In addition, the invention incorporates several design features which dramatically increase the life of the engine as well as the performance of the engine, including increased speed, horsepower and overall engine efficiency.

OBJECTS OF THE INVENTION

It is therefore an object of the invention to provide an improved two-cycle ceramic internal combustion engine.

It is another object of the invention to provide a novel ceramic, two-cycle engine requiring no lubrication and method of assembly and operation.

It is also an object of the invention to provide a novel two-cycle engine having a combination of ceramic and metal components.

It is another object of the invention to provide an improved two-cycle engine having a ceramic engine cylinder without rings, and further having a ceramic piston, ceramic piston pin and a connecting rod with a metallic portion positioned inside a passageway of the ceramic piston.

It is a further object of the invention to provide a novel method of operation and a two-cycle engine having a nonintegrally coupled ceramic cylinder, ceramic piston pin and metallic connecting rod.

It is yet another object of the invention to provide an improved two-cycle engine and method of operation utilizing combustible fuel as a lubricant.

It is still another object of the invention to provide a novel method of assembling a ceramic/metallic two-cycle engine wherein at least one of a ceramic piston or piston pin is in mechanical tension during operation.

It is also an additional object of the invention to provide an improved two-cycle engine constructed of a $Si_3N_4$ cylinder and piston operable using fuel combustion byproducts as a lubricant during engine operation.

It is also a further object of the invention to provide a novel two-cycle engine and method of operation wherein a ceramic piston pin is coupled to a ceramic piston with a metallic connecting rod passageway matingly receiving the ceramic piston pin allowing stress free, free sliding engagement over the operating temperature of the engine.

The features of the present invention which are believed to be novel are set forth with particularity in the appended claims. The invention, together with further objects and advantages thereof, may best be understood by reference to the following description taken in conjunction with the accompanying drawings, wherein like reference numerals identify like elements and wherein:

DETAILED DESCRIPTION OF PREFERRED EMBODIMENTS

Figure 2:
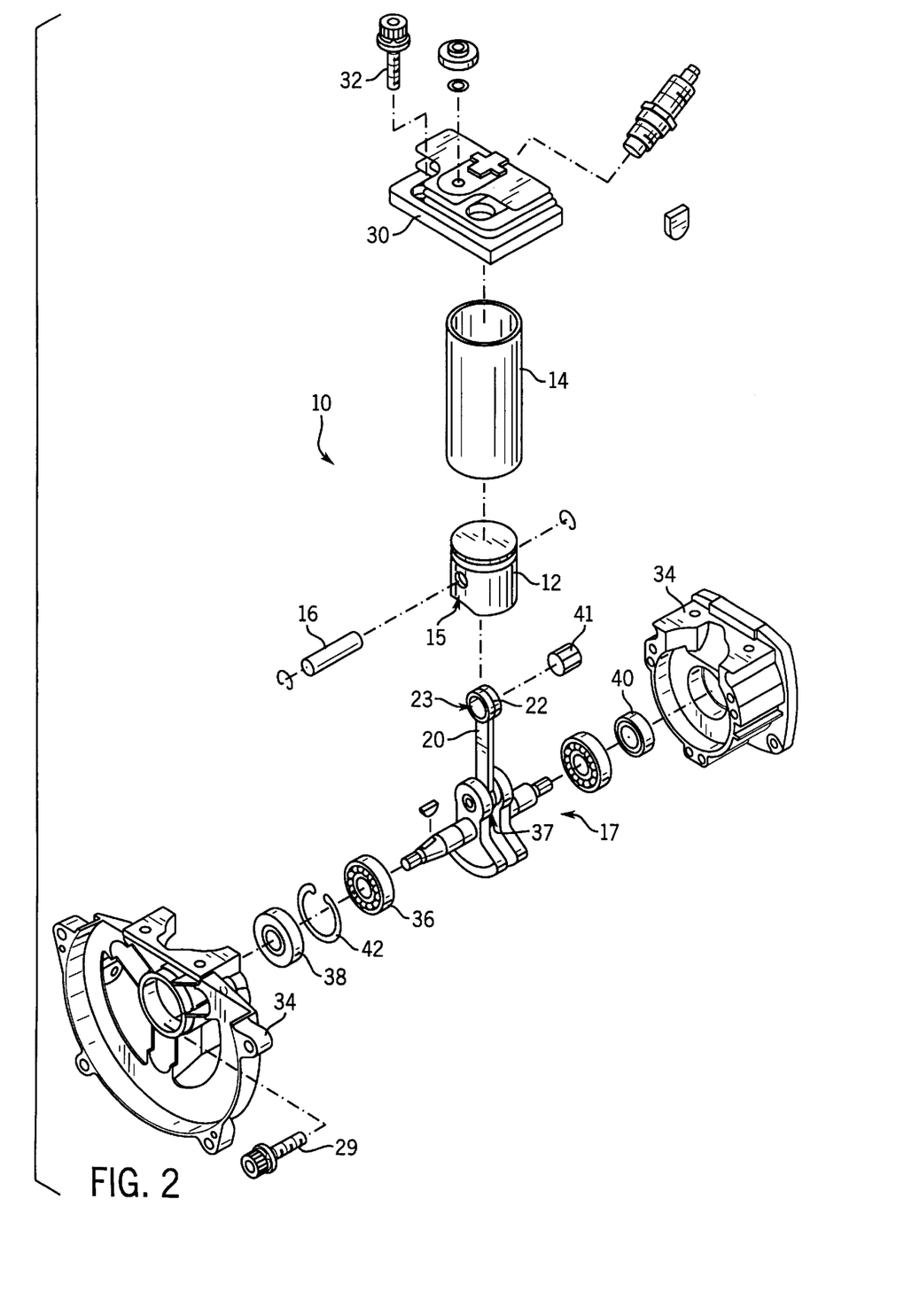
FIG. 2 shows an exploded view of a hybrid ceramic/metallic engine constructed in accordance with the invention.

A two-cycle engine 10 constructed in accordance with the invention is shown in FIG. 2. The engine 10 includes an engine piston 12 and engine cylinder 14 which consist essentially of a ceramic material, with the piston 12 reciprocable within the engine cylinder 14. A piston pin 16 also consists essentially of a ceramic material and has an outer diameter which enables passage through an orifice 15 in the engine piston 12. A crankshaft/connecting rod assembly 17 includes a connecting rod 20 having a metallic portion and is positioned within the ceramic piston 12 and further has a cylindrical housing 22 at its distal end and includes a passageway 23 for receiving the ceramic piston pin 16. Connecting rod bearings 41 are shown as needle bearings, preferably made of silicon nitride. The cylindrical passageway 23 in the connecting rod 20 is matingly and slidingly engageable around the outer diameter of the ceramic piston pin 16 over a wide range of engine temperatures. The engine 10 further includes a cylinder head 30 with a fastener cap screw 32 for coupling to the engine housing (not shown). The engine 10 includes a crankcase 34, engine bearings 36 and 37, oil seals 38 and 40 and snap ring 42 with a fastener cap screw 29.

Figure 1:
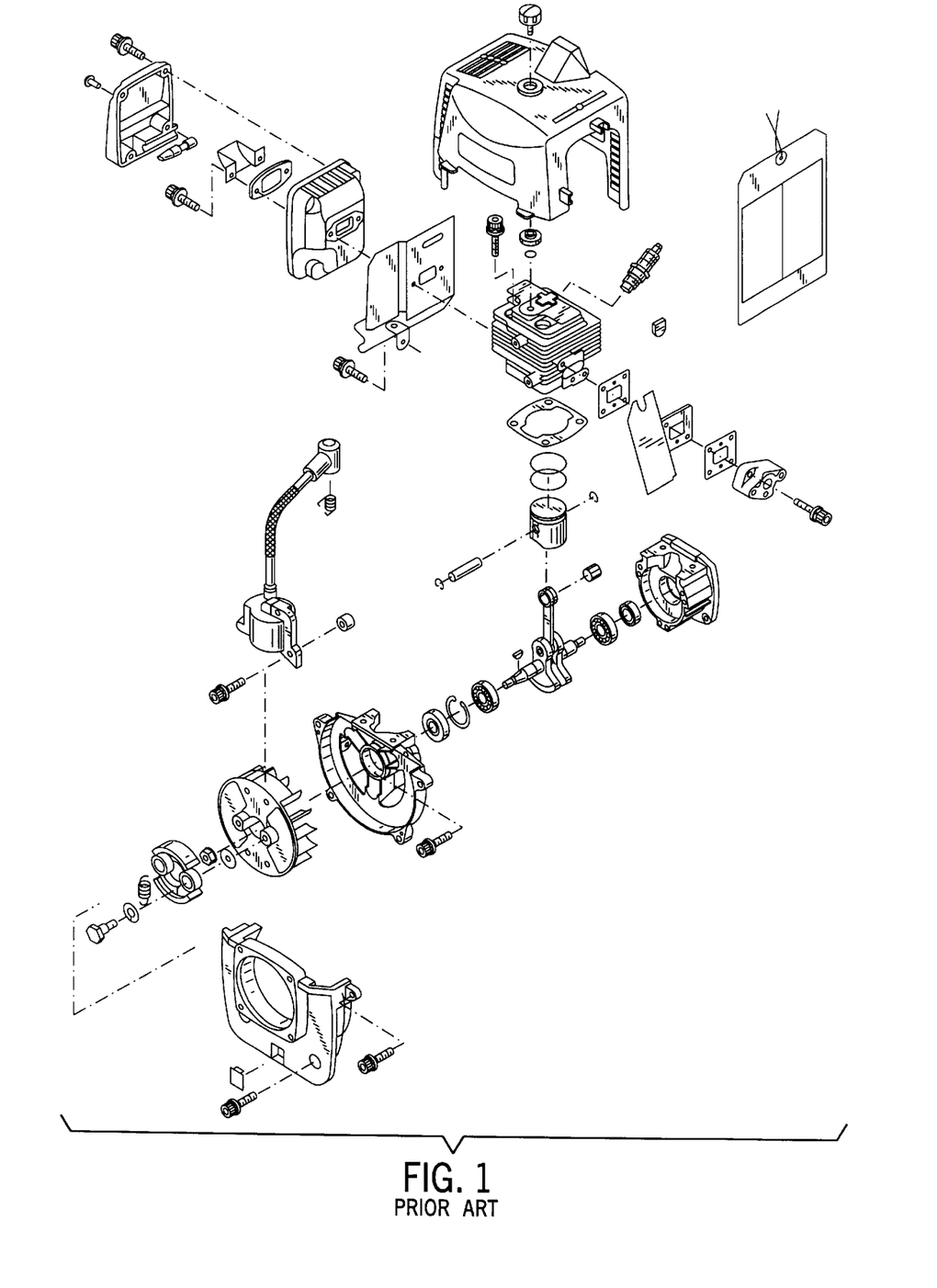
FIG. 1 shows the components of a conventional two cycle engine in an exploded view.

This engine 10 is a hybrid engine because it incorporates ceramic, ceramic coated metallic elements, and metallic components. The engine 10 preferably uses advanced wear resistant materials and arranges the use of these materials in the engine 10 in order to eliminate the need for oil to be mixed with the fuel. Mixing oil with fuel in the conventional engine (shown in FIG. 1) is required to keep the metallic parts from rapidly wearing and catastrophically seizing (a process of local microstructural welding). The use of ceramic or ceramic coated materials, such as silicon nitride, for the sliding and rolling wear elements eliminates these two problems. Silicon nitride rolling element bearings made from materials such as CERBEC, Inc.'s NBD-200 have lasted at least one hundred times as long as all-metal bearings when operated without lubrication. This hybrid engine 10 therefore can totally eliminate the need for the oil lubrication by replacing only four component groups with these advanced materials. These component groups include: (1) the piston 12, (2) the cylinder 14, (3) the piston pin 16, and (4) the engine bearings 36, 37 and 41.

Figure 3:
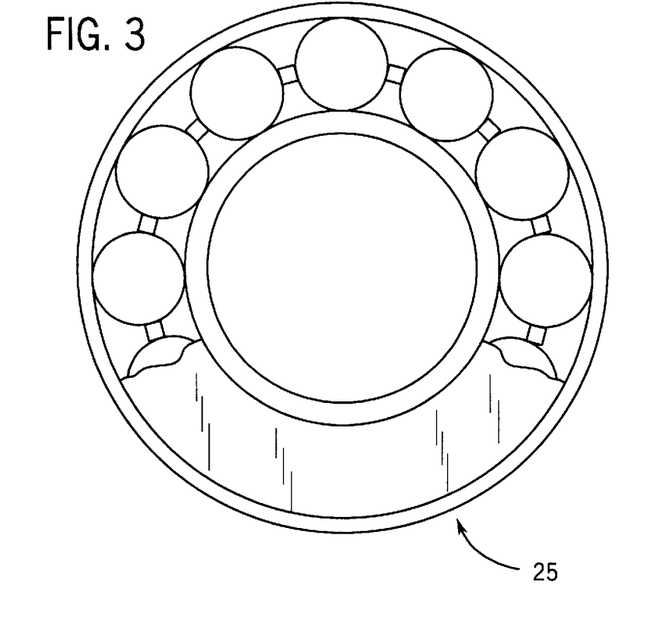
FIG. 3 shows the construction of one of the hybrid ceramic/metallic bearings used in the invention.

The engine bearings 25 shown in FIG. 3 are required at both ends of the connecting rod 20 and are used to support the crankshaft/connecting rod assembly 17. The use of a grease-for-life, hybrid ceramic ball, roller or needle bearings are some of the design options. Hybrid bearings include a rolling element of ceramic material and a nonrolling element constructed of a metallic material. These engine bearings 25 can be lubricated with a high temperature grease such as "Krytox" (a trademark of DuPont Corporation), and are preferably constructed of silicon nitride, as well as incorporate advanced, high temperature polymeric seals, such as silicone elastomers or polyether ether ketone (PEEK), which can last indefinitely in a small engine environment. The bearing steel material preferably is a high temperature tool steel, such as the aircraft bearing material M-50 or equivalent. Such bearings material is available from U.S., Japanese and European manufacturers. It is also possible to operate these hybrid ceramic bearings with only fuel as the lubricant thus not even requiring the seals or high temperature greases. All-ceramic bearings (completely constructed of ceramic, i.e., silicon nitride races and rolling elements) could also be employed.

Figure 4A:
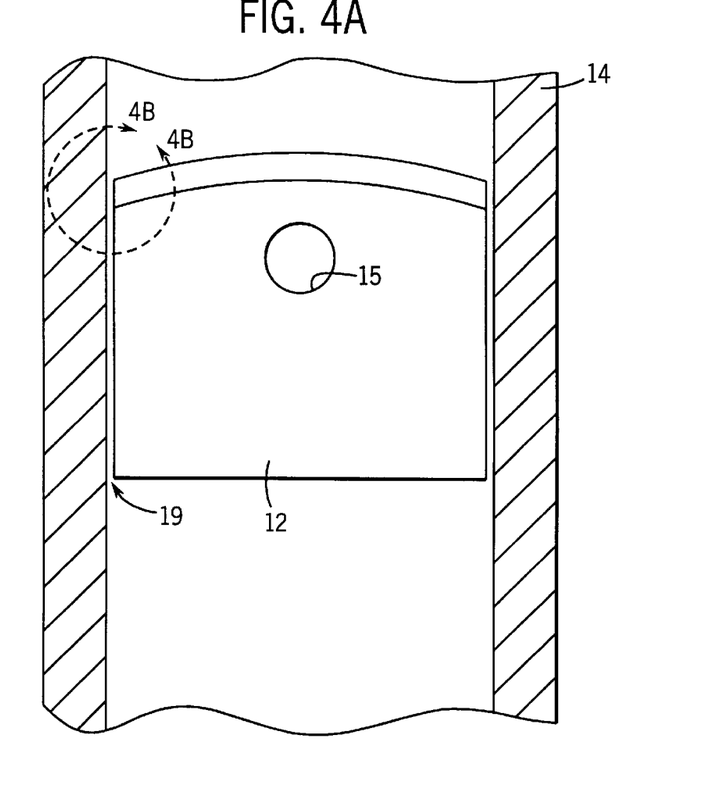
FIG. 4A shows the design of a hybrid piston and cylinder and FIG. 4B is a partial cross-section from FIG. 4A.
Figure 4B:
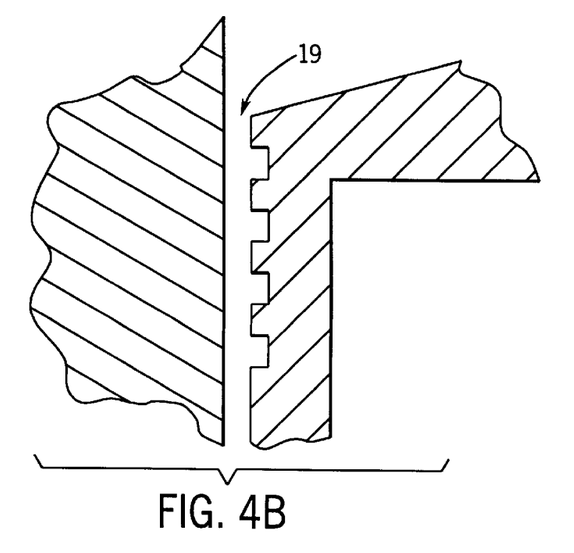
Figure 5:
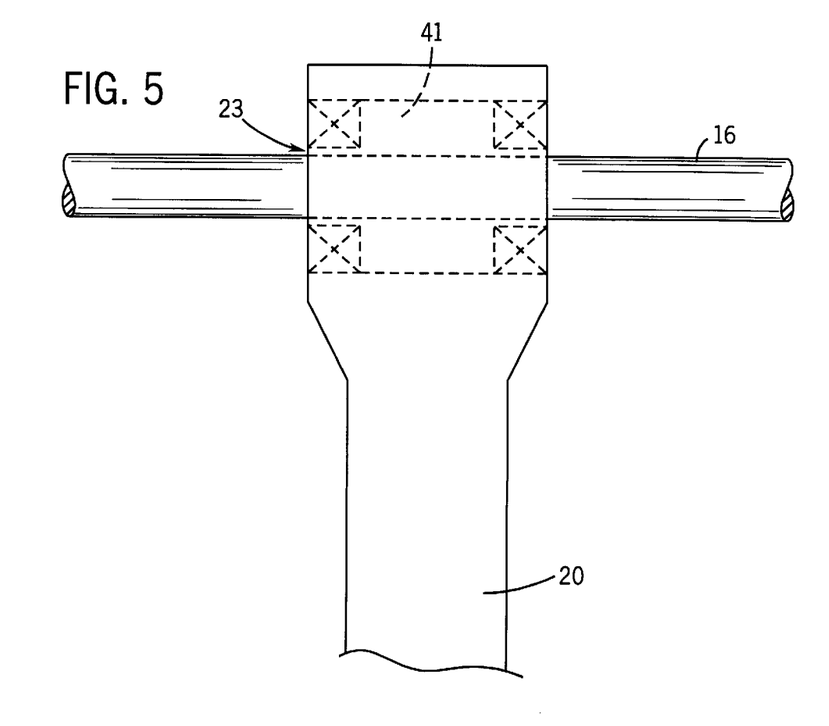
FIG. 5 shows the design of the interface between a piston—piston/pin-connecting rod bearing and connecting rod.
Figure 6A:
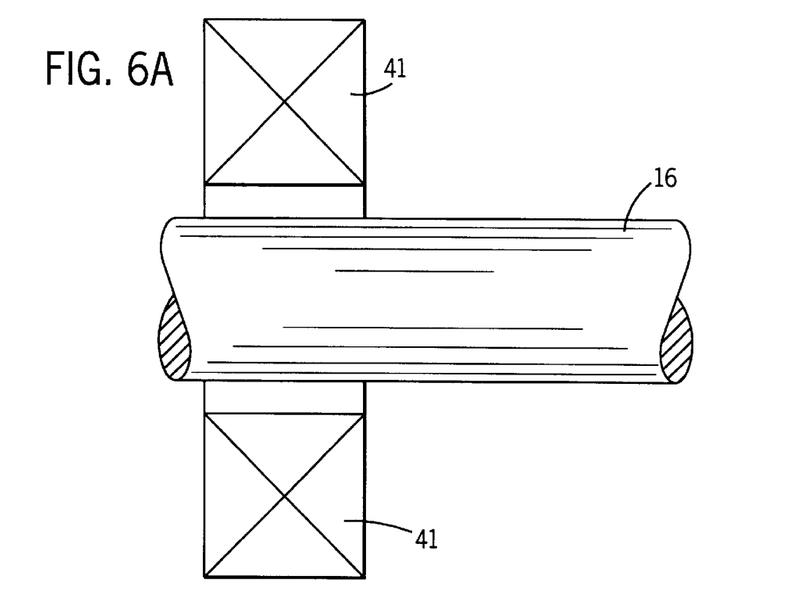
FIGS. 6A and 6B show the configuration of the piston pin in the steel bore of the hybrid bearing at two different temperatures.
Figure 6B:
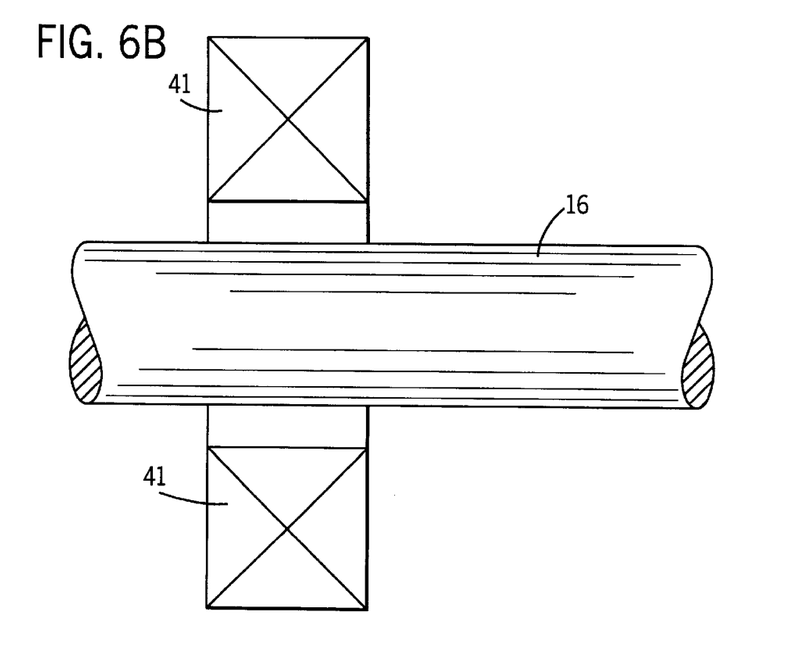

Another aspect of this invention is the construction of the piston 12 and cylinder 14. These components can be produced from ceramic or ceramic coated materials, such as silicon nitride, which allow the engine 10 to run without the need for oil lubrication. These two engine parts are designed to seal without the need for conventional piston rings, and there are several advantages to this general design approach:

1. Elimination of the piston rings reduces the parasitic friction which would be present between the rings and the wall of the engine cylinder 14. This allows the engine 10 to run cooler, more fuel efficiently, at higher speeds and with higher energy output.
2. Elimination of the rings also eliminates the gas pressure driven side wall force on the cylinder 14, thus lowering dramatically the wear rate of these critical parts.
3. The ceramic materials, because of their high rigidity, fine microstructure, lack of major residual stresses, and high hardness can be manufactured to the exacting tolerance required for minimal leakage.
4. The elimination of rings further reduces costs of manufacture, assembly, and repair by simplifying the design of the engine 10.
5. The clearance or radial gap 19 (see FIG. 4A and B) between the piston 12 and the cylinder 14 allows some controlled leakage of combustion products from the gasoline (or other fuels) which contain carbon-containing compounds which have the effect of providing a thin layer of dry lubricant which further reduces wear and friction between the sliding surfaces of the engine 10. The use of this choke flow type of design of the piston 12 is ideally suited for the oil free two-cycle engine 10 when ceramic materials are employed as the structural and wear components.

In another aspect of this invention, the design configuration for the piston pin 16, the engine bearing 25 the connecting rod 20, gives rise to an advantageous structure for the interfaces between the elements. A major problem exists in all hybrid ceramic-metal machinery that operates over a large temperature range. Ceramic materials, in general, have far lower coefficients of thermal expansions ("CTE") than do metals. These differential CTEs between the two different materials cause differential expansion where ceramic parts are interfaced with metal ones. This differential expansion gives rise to extreme levels of strains and consequent stresses develop at these interfaces. In many cases, these stresses are large enough to fracture the ceramic parts. The present invention minimizes or eliminates these differential strains and allows easy sliding engagement of the piston pin 16 within the cylindrical passageway 23 by the following approach:

1. The dimensions of the ceramic component are minimized where the interface to the metal is made. The piston pin 16 most preferably is made from a material from the silicon nitride family, and is of a small diameter (~¼ inch diameter) such that it forms a stable, good fitting interface with the cylindrical passageway 23 of the connecting rod bearing 41.
2. The interface is constructed such that if any differential strains do exist, they will put the ceramic component in compression.

The silicon nitride type piston pin 16 is slip fit into the hybrid bearing 41 in the small end of the connecting rod 20. This is achievable because the differential expansion of the cylindrical passageway 23 and the piston pin 16 is small. For example, consider a small engine having a piston or wrist pin that has an outside diameter of ~0.25 inches, a reasonable diameter for a fractional horsepower engine such as a grass spin trimmer. The differential expansion, $\iota_p$, between the wrist pin and connection rod is:

$$\iota_j = \Delta\alpha \times \iota \times \Delta T$$

where $\Delta\alpha$=the difference in coefficient of thermal expansion between the silicon nitride and the steel, the bearing passageway wall material. At 400–600° F. this value is ~$5 \times 10^{-6}$ in/in/F.

$\iota$=This is the piston pin diameter which is, for this example, 0.25 inches.

$\Delta T$=the change in temperature from the normal reference which in this case is~70 F. The operating temperature in the region of the connecting rod small end is estimated at ~470° F. and thus $\Delta T$ is ~400° F.

substituting into the equation above we obtain:

$$\iota_p 5 \times 10^{-6} \text{ in/in/F} \times 0.25 \text{ inches} \times 400F$$

or $$\iota_j = 500 \times 10^{-6} \text{ inches} = 0.0005 \text{ inches}$$

This small dimensional change of 0.0005 inches is small compared to the slip fit tolerances for the bearing cylindrical passageway 23 and the piston pin 16. Consequently, the differential expansion between the materials is virtually removed as a major design feature of the engine 10 and arises because the temperature difference is reasonably small and the nominal dimension, t is also small. This enables a ready transition from the ceramic to metal component, and the components easily slide without generation of stresses or binding occurring.

Another preferred embodiment of the engine 10 gives rise to the drastic reduction of pollution produced by engine operation. The elimination of the burning of oil (as is a conventional two-cycle engine) reduces the pollutants relative to the level of the four cycle engine.

Another advantageous feature of the invention relates to the wear resistance of the interface between the piston 12 and the cylinder 14. These components are produced from ceramic materials such as CERBEC, Inc.'s, NBD-200 silicon nitride. The sliding wear resistance, unlubricated in air, of various silicon nitride compositional combinations has been studied at very high contact stresses. These studies indicate that at contact stresses above 500,000 psi, the materials have measurable wear rates that are not useful for most engineering applications, even though they are significantly better than metallic materials under the same conditions. The design of the engine 10 affords contact stresses between the cylinder 14 and the piston 12 to be less than 500 psi, or a factor of 1,000 times less than the stresses used by others in their experiments. This large reduction translates roughly proportionally to an increase in the wear resistance of the same multiple. When coupled with the dry lubricant provided by the gasoline combustion products, the sliding couple of the piston 12 and cylinder 14 provides for an extremely long life assembly as supported by the following calculations.

The applicability of the hybrid engine 10 can be demonstrated by performing wear calculations. A conventional approach used to calculate the wear of the piston 12 and cylinder 14 is based on the following generally accepted assumptions:

1. The volume of worn material is directly proportional to the contact stress. That is, lower contact stresses produce lower wear.
2. Wear volumes of the cylinder 14 and the piston 12 are of similar amounts although the piston 12 wears more.
3. If one knows the contact stress, the total distance of sliding contact, the geometry of the wear couple, and the total wear of these materials at a different contact stress but with all other parameters being nearly constant, then one can calculate the volume of wear for this situation.

The mean effective pressure (MEP) of a small, two-cycle engine is of the order of 200–400 psig. This pressure tends to force the piston 12 against the cylinder 14 during operation, thus causing wear (i.e., loss of material) to occur. The piston 12 dimensions for this engine 10 is one-and-a-quarter inches in diameter one-and-a-quarter inches long. The cylinder 14 is also just slightly larger than the diameter of the piston 12 and the worn length of the cylinder 14 is two-and-a-quarter inches (the piston length plus the "stroke").

1. Thus, the piston contact area is $\pi \times 1.25" \times 1.25" = \sim 4.91$ inches$^2 = \sim 3168$ mm$^2$.
2. The piston travel distance is:
   D=1 inch/stroke×2 stroke/cycle×5,000 cycles/minute× 60 minutes/hour×X hours =~50,000 feet/hour×X hours =~15.2 kilometers/hour×X hours
3. The volumetric wear per sliding distance ("VW/DS") @ 200 psig MEP and under low viscosity fuel lubricated conditions for several silicon nitride materials as determined by laboratory data:

VW/DS @ 200 psid MEP=VW/DS @ 190,000 psig×200 psig/190,000 psig.

Note: Conventional VW/DS @ 190,000 psig for several different silicon nitride materials were reported as $\sim 1 \times 10^{-6}$ mm$^3$/km. Thus:

VW/DS @ 200 psig MEP=1×10$^{-6}$ mm$^3$/km×200/190,000 or

VW/DS @ 200 psig MEP=1.05×10$^{-9}$ mm$^3$/km

The above equation indicates that the total wear (mm$^3$) can be calculated if we know the sliding distance of the parts (km). We calculated how far they traveled in paragraph 2 above.

4. The wear volume of the silicon nitride parts can be calculated as follows:

Wear Volume=Wear Volume per Sliding Distance×Distance

Thus from paragraph 2 and 3 above, we have the following results shown in Table I:

TABLE I

Wear Volume versus Operating Hours

| Time; hours | Wear Volume; mm$^3$ | | | |
|---|---|---|---|---|
| | 100 | 1,000 | 10,000 | 100,000 |
| | 1.6 × 10$^{-6}$ mm$^3$ | 1.6 × 10$^{-5}$ mm$^3$ | 1.6 × 10$^{-4}$ mm$^3$ | 1.6 × 10$^{-3}$ mm$^3$ |

5. The change in the radial gap between the silicon nitride piston 12 and the cylinder 14 is a figure of merit for design purposes. If we know the total wear volume, then we can calculate the radial thickness (t) of wear volume by assuming that (1) the wear of the cylinder 14 and piston 12 is moderately uniform although the piston 12 does wear more for geometric reasons and (2) that we apply the formula of a thin walled cylinder 14 where volume=radial thickness×π×one-and-a-quarter inches (the length of the piston 12)×one-and-a-quarter inches (the diameter of the piston 12). Recall from paragraph one above, that π×one-and-a-quarter inches (the length of the piston 12)×one-and-a-quarter inches (the diameter of the piston 12) is the contact area of the piston 12. Thus, the change Δt in the radial gap, t, can be calculated as follows:

Δt=Wear Volume/Piston Contact Area

We know that the wear volume is a function of the sliding distance or, said another way, of the time of operation as shown in Table I above. We also know that the piston contact area is reasonably constant throughout the life of the operation. Thus, we can calculate the radial thickness of the wear volume, t, and compare it to the gap required for the choke flow described hereinbefore. This information is summarized in Table II below.

TABLE II

Worn Radial Thickness of Silicon
Nitride Piston as Function of Engine Operating Hours Worn Radial Thickness, At, mm, vs. Operating Hours

| Time; hours | 100 | 1,000 | 10,000 | 100,000 |
|---|---|---|---|---|
| | $0.5 \times$ | $0.5 \times$ | $0.5 \times$ | $0.5 \times$ |
| $10^{-9}$ mm | $10^{-8}$ mm | $10^{-7}$ mm | $10^{-6}$ mm | |

Note that even at 100,000 hours of operation, the radial thickness increase due to wear is only approximately 10–15 millionths of an inch. These wear volumes can be considered negligible when compared to the choke flow gap in the design.

It should also be noted that the amount of fuel lubricant as well as the operating speed of conventional tests are comparable with the operating conditions of the engine 10.

6. Conventional investigations have been performed of the wear behavior of silicon nitride without any lubricant. Tests in air ("dry") showed VW/DS's for silicon nitrides to be as much as four (4) orders of magnitude greater than the fuel lubricated values. In addition, prior conventional studies had found friction coefficients greater than 0.9 for all of the silicon nitride materials that were tested dry. This value of friction coefficient would generate great amounts of heat in the engine 10, and the engine 10 would perform little mechanical work, thus making this approach totally impractical. Consequently, not only do these materials—silicon nitride materials—not wear well when they are unlubricated, they have very high friction coefficients which severely limit their usefulness in sliding applications.

While preferred embodiments of the invention have been shown and described, it will be clear to those skilled in the art that various changes and modifications can be made without departing from the invention in its broader aspects as set forth in the claims provided hereinafter.

What is claimed is:

1. A two-cycle combustion engine, comprising:
    an engine cylinder consisting essentially of a ceramic material;
    an engine piston consisting essentially of a ceramic material and reciprocable within said engine cylinder;
    a piston pin consisting essentially of a ceramic material and having an outer diameter and passing through said engine piston; and
    a connecting rod having a metallic portion and positioned within said ceramic piston and further having a cylindrical housing at its distal end and including a cylindrical passageway for receiving said ceramic piston pin, said cylindrical passageway in said connecting rod being matingly and slidingly engageable within the outer diameter of said cylindrical passageway; the distance between the outer circumference of said piston pin and the inner circumference of said cylindrical passageway defining a gap, said gap increasing about twenty percent at normal engine operating temperatures compared to ambient temperatures.

2. The two cycle combustion engine as defined in claim 1 further including gasoline and dry lubricant material disposed in the gap between said piston pin and said passageway during operation of the engine.

3. A two cycle combustion engine, comprising:
    an engine cylinder consisting essentially of a ceramic material;
    an engine piston consisting essentially of a ceramic material and reciprocable within said engine cylinder and said engine having a gap between said engine cylinder and said engine piston such that combustible fuel and dry lubricant form a lubricant layer within the gap;
    a piston pin consisting essentially of a ceramic material and having an outer diameter and passing through said engine piston; and
    a connecting rod having a metallic portion and positioned within said ceramic piston and further having a cylindrical housing at its distal end and including a passageway for receiving said ceramic piston pin and said cylindrical housing and said ceramic piston pin defining another gap within which is disposed a lubricant layer of combustible fuel and fuel lubricant during engine operation, said cylindrical passageway in said connecting rod being matingly and slidingly engageable with the outer diameter of said ceramic piston pin over a wide range of engine temperatures without use of oil lubrication.

4. The two cycle engine as defined in claim 3 wherein said combustible fuel comprises gasoline.

5. The two cycle engine as defined in claim 3 wherein said dry lubricant comprises solid material products of combustion.

6. The two cycle engine as defined in claim 3 wherein said gap is about 0.00002 inches.

7. The two cycle engine as defined in claim 3 wherein said another gap is about 0.003 inches.

8. A method of operating a two cycle internal combustion engine, comprising the steps of:
    providing a hybrid engine including a ceramic cylinder, a ceramic piston reciprocable therein with a gap of at least 0.00002 inches between said piston and said cylinder, a ceramic piston pin and a metallic connecting rod having a cylindrical passageway for receiving said ceramic piston pin;
    supplying a fuel to said two cycle engine, said fuel selected from the group consisting of gasoline, kerosene and mixtures thereof; and
    igniting said fuel in said cylinder, thereby forming combustion products including water and carbonaceous dry lubricant products enabling lubrication between said ceramic cylinder and said ceramic piston during engine operation.

9. A method of operating a two cycle internal combustion engine, comprising the steps of:
    providing a hybrid engine including a ceramic cylinder, a ceramic piston reciprocable therein, a ceramic piston pin and a connecting rod having a cylindrical passageway for receiving said ceramic piston pin with a gap formed between said cylindrical passageway and said piston pin;
    supplying a fuel to said two cycle engine, said fuel selected from the group consisting of gasoline, kerosene and mixtures thereof;
    igniting said fuel in said ceramic cylinder, thereby forming combustion products including water and carbonaceous products; and
    lubricating surfaces between said ceramic cylinder and said ceramic piston and disposing in the gap between said ceramic piston pin and said cylindrical passageway a dry lubricant and combustible fuel during engine operation.

* * * * *

UNITED STATES PATENT AND TRADEMARK OFFICE
CERTIFICATE OF CORRECTION

PATENT NO. : 6,050,234

DATED : April 18, 2000

INVENTOR(S) : Hannoosh

It is certified that error appears in the above-identified patent and that said Letters Patent is hereby corrected as shown below:

On the cover page of the patent, the priority information should be listed: - - This application is a continuation of U.S. Serial No. 08/278,914 filed, July 22, 1994 - -.

Signed and Sealed this

Tenth Day of April, 2001

*Attest:*

NICHOLAS P. GODICI

*Attesting Officer*       *Acting Director of the United States Patent and Trademark Office*